United States Patent [19]
Guntersdorfer et al.

[11] 3,748,504
[45] July 24, 1973

[54] PIEZOELECTRIC MOTOR

[75] Inventors: Max Guntersdorfer, Munich; Walter Heywang, Neukerferloh, both of Germany

[73] Assignees: Siemens AG, Berlin; Braun AG, Munich, Germany

[22] Filed: Feb. 16, 1972

[21] Appl. No.: 226,740

[30] Foreign Application Priority Data
Feb. 17, 1971 Germany.................. P 21 07 590.1

[52] U.S. Cl..................... 310/8.2, 310/8.6, 310/9.1, 310/9.5
[51] Int. Cl............................................ H04r 17/00
[58] Field of Search..................... 310/8.2, 8.3, 8.6, 310/9.1, 9.4

[56] References Cited
UNITED STATES PATENTS
2,325,238  7/1943  Flint................................ 310/8.6 X
2,182,340  12/1939  Hearn.............................. 310/8.6 X
3,132,286  5/1964  Harrison......................... 310/8.2 X
3,166,683  1/1965  Gootherts........................ 310/8.6
3,067,345  12/1962  Harris.............................. 310/8.6

Primary Examiner—J. D. Miller
Assistant Examiner—Mark O. Budd
Attorney—Carlton Hill, Lewis T. Steadman et al.

[57] ABSTRACT

A piezoelectric motor, in particular a vibrator, for producing essentially straight line movements of a part, in which a plurality of piezoelectrically excitable bending strips are mutually mechanically connected in parallel as a package between the part to be moved and a fixed part. The motor is particularly suited for use in an electric dry shaver and has high mechanical power and efficiency, less noise and less weight than prior piezoelectric motors.

2 Claims, 7 Drawing Figures

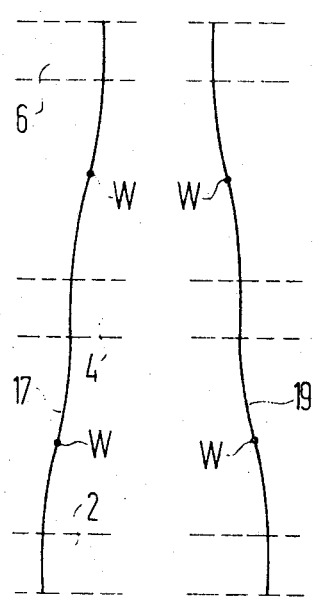
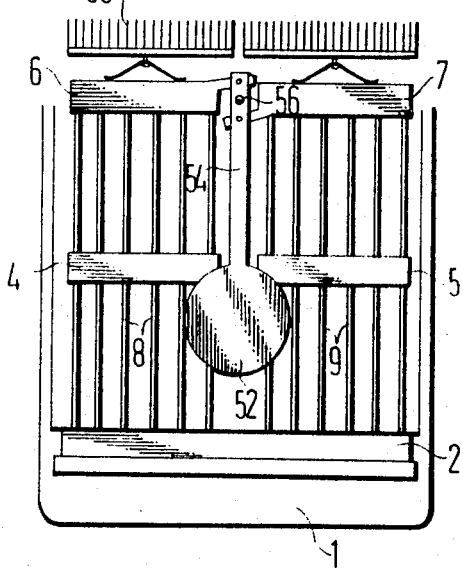
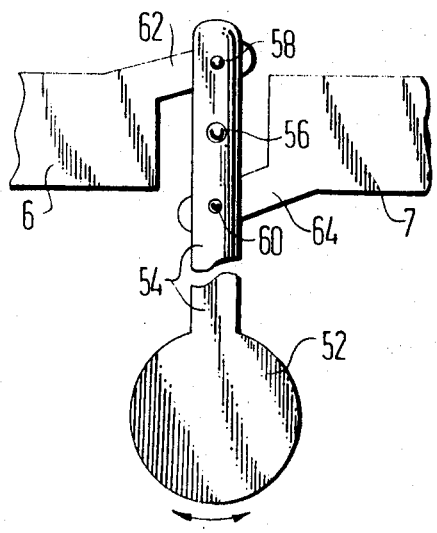

PIEZOELECTRIC MOTOR

BACKGROUND OF THE INVENTION

1. Field of the Invention

This invention relates to a piezoelectric motor for producing essentially rectilinear shifting movements of a part to be moved in a reciprocating or vibrating manner.

2. Description of the Prior Art

A prior application, Ser. No. 179,449 filed Sept. 10, 1971 discloses a piezoelectric motor in which a plurality of piezoelectrically excitable bending strips are mechanically connected in parallel as a package and are further arranged in such parallel relation between a part to be moved and another, preferably fixed, part of the motor. The bending strips essentially comprise carrier strips lined with strips of piezoceramic and are mounted together with the carrier and ceramic strips at mounting points.

SUMMARY OF THE INVENTION

It is an object of the present invention to provide an improved piezoelectric motor of the type described above which has higher power and greater efficiency, in particular with an equally larger construction, and to provide such a motor which operates with little noise and be of as little weight as possible.

According to the invention the above and attendant objects are realized through the provision of a piezoelectric motor of the same general character as that set forth in the above identified application in that one or more mounting devices are provided along with a spacing member between adjacent bending strips. The spacing members are shaped and inserted in such a way that the bending strips and the spacing members are aligned in a form locking relationship without resulting in a mechanical shunt. It is essential for the present invention that a mounting is obtained which is as firm and hard as possible and which supports the entire contact surface between strip and spacing member. While it is true that the pressure resistance of the piezoceramic represents an upper limit for the magnitude of the tension pressure, it has extremely high values with homogenously distributed compressive forces. A certain mechanical shunt may, however, result in the embodiment illustrated in the second figure of the aforementioned application with form locking direct contact of the spacing members on a portion of its cross-sectional surface.

It is advantageous to provide the mounting for a piezoelectric motor, according to the present invention, in which the bending strips comprise carrier and ceramic strips mounted at both ends so that the bending strips have a nodal point during operation.

According to a particular feature of the invention the bending strips are mounted, not only at their ends, but intermediate the ends at one or more locations.

The bending strips have a nodal point of their bending movement between two adjacent mounting places during operation according to a further feature of the invention and therefore execute multiple stage-wise S-shaped bendings.

BRIEF DESCRIPTION OF THE DRAWINGS

Other objects, features and advantages of the invention, its organization, construction and operation will be best understood from the following detailed description of preferred embodiments thereof taken in conjunction with the accompanying drawings, in which:

FIG. 3 is a graphical illustration of the vibratory mode of operation of a piezoelectric motor according to the present invention;

FIGS. 5 and 6 illustrate a mechanical coupling of two oppositely phased vibrating bending member packages.

DESCRIPTION OF THE PREFERRED EMBODIMENTS

Figure 1:
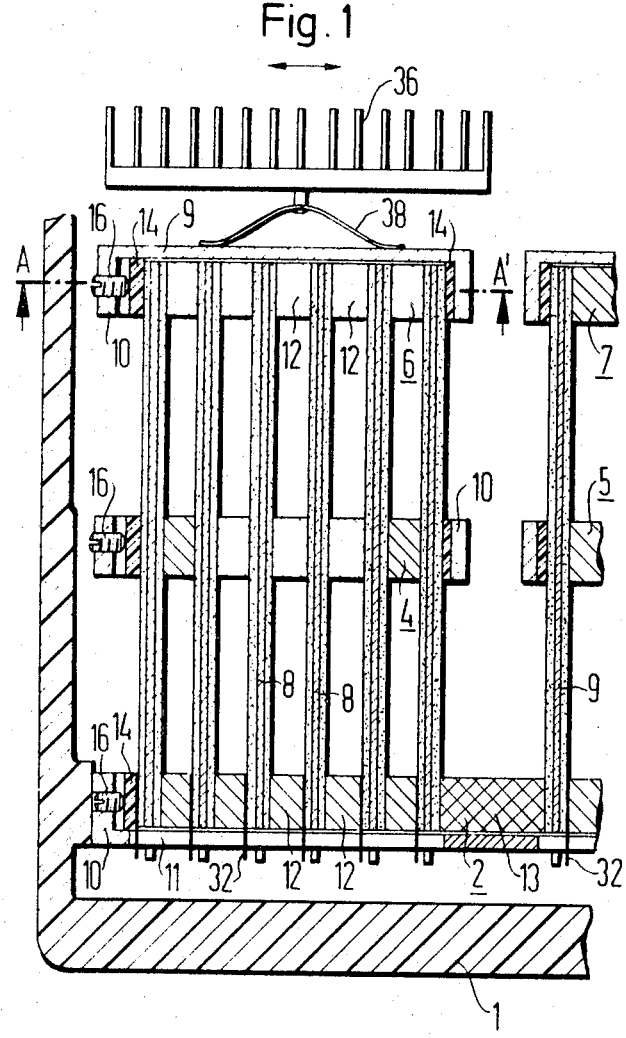
FIG. 1 is a sectional elevational view of a piezoelectric motor constructed in accordance with the principles of the present invention.

Referring to FIG. 1, a piezoelectric motor constructed in accordance with the teachings of the present invention is illustrated as having a housing 1, which is only partially shown. A plurality of mounting devices 2, 4 and 6 are provided according to the present invention to mount a plurality of bending strips 8. The bending strips 8, each a composite of carrier and ceramic strips, are mounted with their ends secured in the mounting devices 2 and 6.

According to a preferred embodiment of the mounting devices, the latter respectively comprise a frame 10, a plurality of spacing members 12 and a further plurality of intermediate members 14, as well as one or more mounting screws 16. Advantageously, the frame 10 of the mounting devices 2 and 6 have respective bottom walls 9 and 11 for additional stiffening preferably connected to form a one piece frame. The bottom wall 11 includes slots for receiving electrical contact lugs 21, 32 therethrough. In order to simplify understanding of the mounting of the bending strips 8, the mounting device 6 has been illustrated in section in FIG. 2 taken generally along k the line A—A' of FIG. 1. The bending strips A are mounted together firmly between the intermediate members 14 by means of tightening the mounting screws 16, in such a way that a pressure will result on the entire mounting surface, which pressure has as even an effect as possible. This type of mounting of the bending strips together, along with a high pressure which can be borne by the ceramics, accomplishes the force and power increase objective of the invention.

In the place of the mounting screws 16, a recess may, for example, be employed in the frame and fixation with high pressure may be effected by the utilization of wedges.

In the place of a frame as illustrated in FIG. 1, a device with transverse arms mounted together by means of screws may be utilized.

As has been described in the above identified application for patent, the bending strips 8, due to their rigid mounting at both ends and the construction of the bending strips, which will be further explained below, carry out S-shaped bending movements with a nodal point W (FIG. 3) of the bends. The resonant frequency of such a construction is higher than that of a construction which operates with a simple bend.

According to the above mentioned preferred further development of the invention, an additional mounting of the bending strip 8 by means of the mounting device 4 is provided in order to further increase the force or power, respectively, of the motor. The mounting device 4 is attached approximately at the center of the bending strips 8 between the two ends thereof. The mounting device 4 essentially corresponds to the mounting device 6. A bending movement of the strips 8 is forced by the additional mounting device 4, as has been schematically illustrated for a deflection toward the right in FIG. 3 in the left illustration 17. Among other things, this results in a further increase of the resonant frequency.

Figure 4:
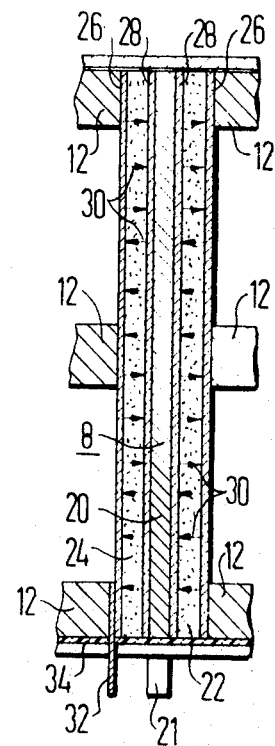
FIG. 4 is a fragmentary sectional view showing the bending members of FIG. 1 in greater detail.

A bending strip 8 has been provided for this motor operation whose principle construction is illustrated in FIG. 4, such illustration being essentially exaggerated with respect to the thickness shown in FIG. 1. A bending strip 8, as preferably utilized for the present invention, comprises a carrier strip 20, a pair of ceramic strips 22 and 24 which are firmly connected with the strips 20 along the entire adjacent surfaces thereof, and electrode codings 26 which are secured to the outer surfaces of the bending strips. As illustrated in FIG. 4, the carrier strip 20 is electrically conductive and carriers further electrically conductive electrode coatings 28 and is electrically connected to the contact lug 21. If the carrier strip 20 should consist of relatively poorly conductive material, or an electrically more or less insulating member is provided between the ceramic strips 22, 24 and the carrier strip 20, the electrode coatings 28 will be provided on the inner surfaces of the ceramic strips 22 and 24. The electrode coatings 28 may be extended outwardly for external connection to an electrode, such as the lug 21. As illustrated in FIG. 4, however, the coatings 28 are galvanically connected with the electrically conductive carrier strip 20 and thereby connected to the contact lug 21.

It should be mentioned that bending strips having other embodiments may also be utilized. For example, bending strips comprising a carrier strip and a single ceramic coating are suited for the invention. Another applicable embodiment of a bending strip provides a pair of ceramic strips, such as strips 22 and 24, without the intermediate carrier strip, i.e. a bending strip of pure ceramic elements.

In order to obtain the shape of bending of the strips as indicated in FIG. 3 with as much effect for the motor as possible, it is also provided that the polarization and excitation of the ceramic strips are adapted to each other in a particular manner.

FIG. 4 illustrates a particularly preferred selection of the polarization of the ceramic strips 22 and 24 which allows excitation of the bending strips in a particularly simple manner. The polarization direction which is selected along the ceramic strips 22, 24 is represented by the arrows 30. As can be readily seen in FIG. 4, the direction of polarization changes between two adjacent mounting places, i.e., in this case with center mounting, between one end mounting place and the mounting place located at substantially one half the length of a strip, and particularly parallel to the thickness of the strip in opposite directions. A corresponding situation exists with the other half of each strip along its length. If an electrical direct voltage is applied between the carrier strip 20, or between the electrode coatings 28, respectively, and the parallel-connected electrodes 26, a double S-shaped deflection will result as is indicated in FIG. 3. In the case of the presence of an electrical alternating voltage, periodic bending movements will result, corresponding to the frequency of the voltage. The right hand illustration in FIG. 3 shows the deflection of this strip which is phase-shifted with respect to the left hand illustration by 180°. For example, the contact lugs 32 are provided for supplying the electrical voltage to the electrodes 26, which contact lugs 32, together with the spacing members 12, are held in the mounting device 2. (A similar connection is provided with the electrodes 26 and the spacing members 12 in the mounting devices 4 and 6.) The contact lugs may also be portions of the spacing members. Spacing members 12 are electrically conductive, in particular with the above selection of polarization and excitation, so that the electrodes 26 of two adjacent strips are electrically connected by means of one contact lug 32, respectively. The contact lugs 21 for connecting the carrier strips extend out of the mounting device 2, for instance downwardly.

The dimensioning of the thickness of the ceramic strips 22 or 24, respectively, is selected in such a way that an operation of the motor at 110 volts can be effected. Therefore, the ceramic strips 22 and 24 of each bending strip (8, 9) are connected electrically in parallel. With 220 volts net voltage it is preferred that two sets of bending elements with an equal number of bending strips are connected in line with each other. Therefore, a corresponding electrical insulation of these two sets of elements with respect to each other is provided.

With a length of 40–80 mm, preferably 66mm for an individual strip, a thickness of the carrier strip of 0.08–0.15mm, preferably 0.1mm, and of the ceramic strips of 0.15–0.25mm, preferably 0.22mm, has proven to be particularly advantageous.

With the bending strips as provided, a bending in the transverse direction will also occur, which transverse bending is connected with the longitudinally directed bending. This transverse bending advantageously increases the mounting power during operation.

Small insulator plates 34 are inserted laterally and against the bottom into the frame 10 for the electrical insulation of the bending strips 8 with respect to the frame 10 and for the sake of an electrically nonconductive frame.

A piezoelectric motor, as it is illustrated partially and schematically in FIG. 1 with the six bending strips 8 is suited, for example, for driving the shaving head of an electric dry shaver. Such a shaving head 36, schematically illustrated, is attached at the upper end of the bending strips 8 in FIG. 1 at the mounting device 6 or, as illustrated by means of a further part 38, for example, a spring, which is connected to the mounting device 6.

In FIG. 1, an additional embodiment of the invention has been illustrated in which two packages of co-mounted bending strips are provided, which are essentially equal with respect to construction and number. Only one bending strip 9 and the mounting devices 5 and 7, the latter illustrated in a broken manner, can be seen of this second package. The mounting devices 5 and 7 essentially correspond to the above described mounting devices 4 and 6. The bending strips 9 correspond to the bending strips 8 and are operated in an opposite-phase manner with respect to each other in order to obtain the mass balance required for an operation of the motor with little vibration. FIG. 3 schematically illustrates at 17 and 19 the opposite phase deflection of the bending strips 8 and 9. The packages with the bending strips 8 and 9 of which only one bending strip 9 is illustrated in FIG. 1, are preferably rigidly connected with each other by means of the (lower) mounting device 2. These two packages form a single unit in this manner with respect to mechanical vibrations.

As has been mentioned above, two packages with an equal number of bending strips are connected electrically in series for operation at 220 volts. This can be effected with this particular embodiment in a simple manner whereby preferably electrically non-conductive material is provided for the spacing member 13.

The second package having the bending strips 9, drive a second shaving head (not illustrated) corresponding to the shaving head 36.

With a motor constructed according to the principles of the present invention and the particular features thereof, a particularly high power or working capacity, respectively, can be obtained when the resonant frequency of the basic oscillation of the motor, together with the part or parts which are to be moved by the motor, is higher than the frequency of the exciting electrical voltage, by a factor of 1.2–1.6. With a supply frequency of 50 or 60 Hz, respectively, it may be necessary to lower the resonant frequency of the motor. This can be done by means of applying correspondingly large masses to the freely moving end of the bending strips; however, in order to avoid an excess weight for the device, it is advantageous to mechanically couple one or several correspondingly smaller masses with a transmission to the freely moving end of the motor. It is of particular advantage to couple this mass or these masses together with a mutual mechanical coupling of the free ends of two opposite phase oscillating packages of a motor constructed according to the invention, which coupling may be provided in any suitable manner.

Such an embodiment is shown in the schematic illustration of FIGS. 5 and 6. The other individual features of a construction of the motor according to these figures corresponds to the preceeding description.

In FIGS. 5 and 6 the two mounting devices 6 and 7, together with a mass 52, are connected by way of two arm lever 54. The joint or pivot 56 is secured to the housing 1, in a manner not illustrated in the drawing. Outwardly extending arms 62 and 64 are provided for the respective mounting devices 6 and 7. Respective pivotal connections 58 and 60 for the arms 62 and 64 represent a mechanically movable connection between the freely oscillating ends of the two packages of the motor by way of the two arm lever 54. The amount of mass 52, in relation to the square of the length of the lever arms can be kept small.

In order to obtain a favorable balance, the mass 52 can be provided and attached on both sides of the motor with respect to the oscillation plane of the packages. Preferably, an opposite phase movement can be provided for these masses, particularly for the extensive compensation of the inertial forces of the masses.

This translation of the mass forces, according to this invention, can also be utilized with a piezoelectric motor having mounting devices which are different than those described above.

Figure 7:
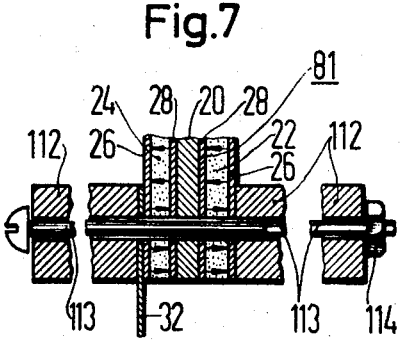
FIG. 7 shows a different mounting device.

In a further embodiment of the invention, the bending strips and the spacing members are mounted together with the help of a screw, with a mounting device wherein the screw is extended through bores in the bending strips and spacing members. FIG. 7 illustrates such an embodiment in a sectional view.

Figure 2:
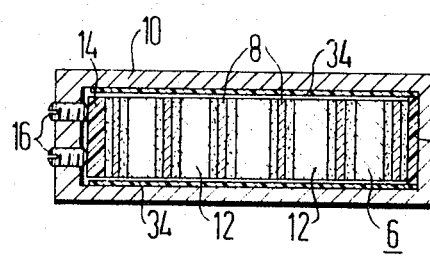
FIG. 2 is a sectional view taken generally along the line A—A'.

FIG. 7 illustration and embodiment for a hard and fixed mounting, according to the invention, whereby the bending strips and the spacing members are clamped together with the help of a screw 118 and a nut 114. The screw 118 extends through corresponding bores of the bending strips 81 and the spacing members 112. Only the lower end of a bending strip 81 is illustrated in FIG. 7. The construction of the bending strips 81, which are to be arranged side by side, corresponds, for example, to the bending strips 8 as illustrated in FIGS. 1, 2 and 4, with the exception of the additional bores.

Although we have described our invention by reference to specific illustrative embodiments thereof, many changes and modifications of our invention may become readily apparent to those skilled in the art without departing from the spirit and scope of our invention. We therefore intend to cover within the patent warranted hereon all such changes and modifications as may reasonably and properly be included within the scope of our contribution to the art.

We claim:

1. A piezoelectric motor for producing reciprocating motion of movable parts, comprising: a housing; a plurality of first parallel piezoelectrically excitable elongate bending elements aligned with each other and disposed in said housing, each of said first elements having first and second ends; a plurality of parallel piezoelectrically excitable elongate bending elements aligned with each other and with said first bending elements and disposed in said housing, each of said second elements having first and second ends; a plurality of first spacing members and a plurality of second spacing members, said first and second spacing members disposed between and contacting the respective first and second ends of said bending elements; a first mounting device connected to said housing and securing said first ends of said first and second elements and said first spacing members; second and third mounting devices carrying respective ones of the movable parts and respectively securing said second ends of said first and second elements and said second spacing members, said second bending elements adapted to reciprocate 180° out of phase with respect to said first bending elements; and a mechanical lever arrangement connected between said first elements and said second elements to lower the resonant frequency of said first and second elements and compensate for the opposite forces due to the out of phase operation of said first and second elements.

2. A piezoelectric motor according to claim 1, wherein said mechanical lever arrangement comprises a pendulum shaped device having a mass portion and an arm portion extending therefrom and pivotally fixed to said housing, said second mounting device of said first plurality of bending elements and said third mounting device of said plurality of second bending elements pivotally attached to said arm portion on opposite sides of its pivotally fixed connection to said housing.

* * * * *